May 19, 1970  JIHACHIRO UTSUMI  3,512,693
MOVIE FILM FEED SPROCKET FOR PROJECTOR
Filed March 29, 1968  2 Sheets-Sheet 1
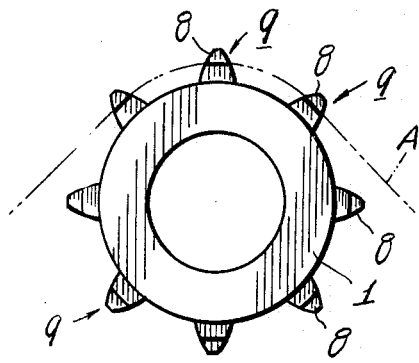
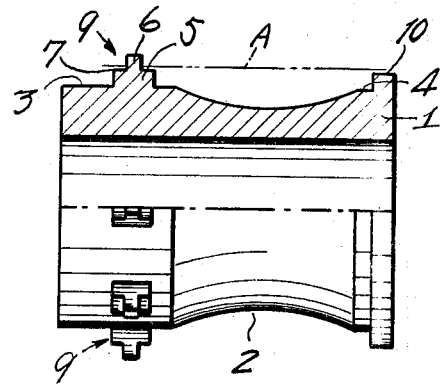
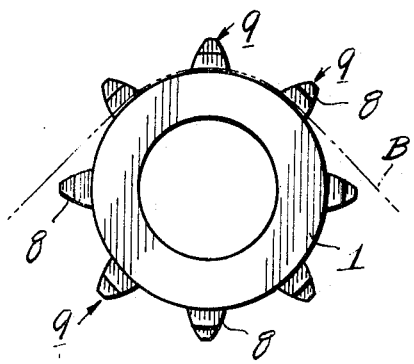
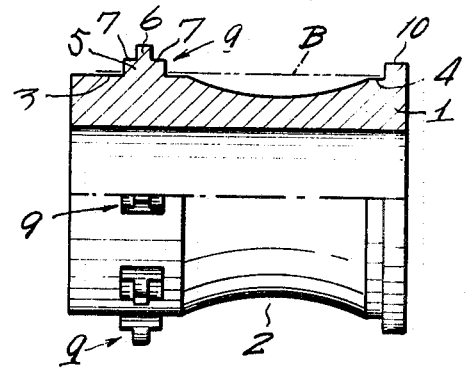
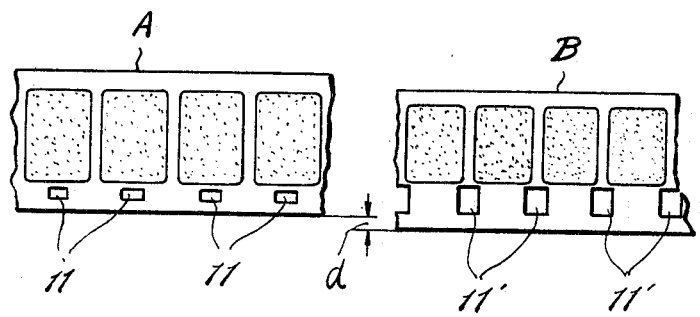
INVENTOR
Jihachiro Utsumi
BY *Jerome Bauer*
ATTORNEY

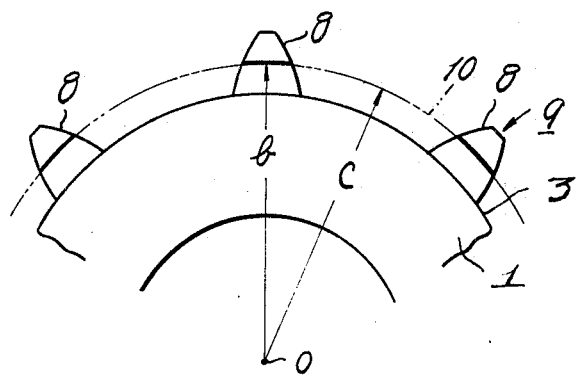

United States Patent Office 3,512,693
Patented May 19, 1970

3,512,693
MOVIE FILM FEED SPROCKET FOR PROJECTOR
Jihachiro Utsumi, Yokohama, Japan, assignor to Kabushiki Kaisha Bell Ko-On, Tokyo, Japan, a joint-stock company of Japan
Filed Mar. 29, 1968, Ser. No. 717,298
Claims priority, application Japan, May 1, 1967, 42/36,209
Int. Cl. G03b 1/24
U.S. Cl. 226—54          7 Claims

ABSTRACT OF THE DISCLOSURE

A film feed sprocket for an 8 mm. projector employed for feeding two different types of 8 mm. movie films and which has spaced first film support means for one said two different types of movie films, and spaced second film support means for another type of movie film.

---

The modern movie industry generally employs two types of 8 mm. movie films, each of which has a width corresponding to one half of that of 16 mm. movie film. One of the two types of 8 mm. movie films has been developed prior to the other type 8 mm. movie film. Therefore, for the purpose of explanation of the present invention, the earlier developed film will be referred to as "old type 8 mm. film" hereinafter. While the later developed film will be referred to as "new type 8 mm. film."

In the old type 8 mm. film, the distance between the centers of the adjacent feed holes which are formed in a row adjacent to only one edge of the film is one-half of the distance between the centers of the adjacent feed holes which are also formed in a row adjacent to only one side edge of 16 mm. film. The shape of the feed holes in the old type 8 mm. film is rectangular with the dimension in the widthwise direction of the film being greater than that in the lengthwise direction, and each of the feed holes having a rather large area.

The new type 8 mm. film has the same width as the old type 8 mm. film, however, the distance between the centers of the adjacent feed holes (which are similarly formed in a row adjacent to only one side edge of the new type 8 mm. film) is somewhat greater than that between the centers of the adjacent feed holes in the old type 8 mm. film. Furthermore, the shape of the feed holes in the new 8 mm. film is rectangular, with the dimension in the lengthwise direction of the film being greater than that in the widthwise direction. Each of the feed holes in the new type 8 mm. film has a smaller area than that of the feed holes in the old type 8 mm. film. In addition, the feed holes in the new type 8 mm. film are nearer to the closest side edge of the film strip than are the feed holes in the old type 8 mm. film to the closest edge of its associated film strip.

It is of course desirable that a single projector may selectively project both types of 8 mm. film. However, the provision of separate sprockets for each one of the two types of 8 mm. films, and the consequent requirement to selectively use one sprocket or the other, one depending upon the type of 8 mm. film which is to be moved through the projector, not advisable because replacement of one sprocket with the other one requires cumbersome insertion and removal manipulations. In addition, if separate sprockets are provided for each one of the two types of 8 mm. films, the number of parts in a projector which is designed to use each one of the two different sprockets will be increased, resulting in an increase in the complexity of the mechanism for operating such sprockets, and an increase in the manufacturing cost of the projector.

If friction wheels are employed in place of sprockets for the purpose of feeding movie films in a projector, the complexity of the mechanism for operating such friction wheels and the cumbersomeness in connection with replacement of the sprockets may be eliminated. However, it is generally difficult to feed films with precision in such projectors, and thus the use of friction wheels for feeding films is impracticable.

The present invention provides a novel and improved sprocket for feeding movie films in a projector, and more particularly to a sprocket for a projector which can selectively feed either one of the two different types of 8 mm. movie films now available in the movie industry without complicating the construction of the projector in which said sprocket is employed, while avoiding the disadvantages which are inevitable when two conventional separate sprockets for the different types of 8 mm. film are employed, or when conventional friction wheels are employed in place of conventional separate sprockets.

Another object of the present invention is to provide a sprocket for a projector which can selectively feed either one of the two different types of 8 mm. movie films now available in the movie industry and which can replace the two conventional separate sprockets for each of the two types of 8 mm. films and accordingly, can avoid the cumbersomeness which has been experienced when separate sprockets for each of the two types of film have been employed.

Another object of the present invention is to enable a conventional projector to selectively project either of the two different types of 8 mm. movie films now available in the movie industry with a minimum degree of modification of the projector, which modification involves installation of the novel sprocket of the present invention which can selectively feed either of said two types of 8 mm. movie films in place of a conventional film feed sprocket which is designed to feed only one type of 8 mm. movie film.

A still further object of the present invention is to provide a movie film feed sprocket which can selectively feed either of the two different types of 8 mm. movie film now available in the movie industry and which can be produced at a comparatively low cost.

According to the present invention, there is provided a 8 mm. movie film feed sprocket for a projector adapted to selectively feed two different types of 8 mm. movie films and comprising a hollow cylindrical rotary body having a curved peripheral recess between the opposite ends. Laterally spaced first film support means are provided adjacent to and outwardly of the opposite ends of said peripheral recess for supporting one type film. A plurality of equally angularly spaced film feed teeth are provided in the first film support means adjacent to and outwardly of one end of said recess, with each of said teeth having a stepped construction including an upper portion of reduced width in the axial direction of the cylindrical body. The junction between the lower and upper portions of each tooth is connected by a shoulder. An annular projection in the form of a flange is provided at the end of the body opposite to the end where said film feed teeth are provided, whereby said shoulder and flange cooperate to form laterally spaced second film support means for supporting the other type of film.

The above and other objects and advantages of the present invention will be more readily apparent to those skilled in the art from the following description when read in connection with the accompanying drawings which form a part of the specification.

FIG. 1 is an end elevational view of a preferred form of film feed sprocket for a projector constructed in accordance with the present invention for feeding the new type of 8 mm. movie film;

FIG. 2 is a side elevational view in partial section of said sprocket and film as shown in FIG. 1;

FIG. 3 is similar to FIG. 1 showing the old type of 8 mm. movie film being fed by said sprocket;

FIG. 4 is a side elevational view in partial section of said sprocket and film as shown in FIG. 3;

FIG. 5 is a fragmentary plan view of said two types of 8 mm. movie films;

FIG. 6 is a fragmentary view of said sprocket on an enlarged scale geometrically illustrating its principal portions.

Reference will be now had to the accompanying drawings in which a preferred form of movie film feed sprocket for a projector constructed in accordance with the present invention is shown for illustration purposes only. In FIGS. 1 to 5 inclusive, reference character A designates a portion of the new type 8 mm. movie film, and reference character B designates a portion of the old type 8 mm. movie film.

The novel sprocket comprises a hollow cylindrical rotary body 1 having an arcuate or concave peripheral recess 2 formed intermediate its ends, with peripheral, laterally spaced first film peripheral support surfaces 3 and 4 being defined respectively and outwardly of the opposite ends of the recess 2. The peripheral support surface 3 extends from one extreme end of the body 1 (the left-hand end as seen in FIGS. 2 and 4) laterally inward to the adjacent end of the recess 2. A cooperating peripheral support surface 4 extends from a point adjacent to and beginning at the opposite end of the recess 2 up to a radially disposed flange 10 that borders the opposite periphery of the body 1. As will be seen from FIG. 2 the width or lateral extent of the surface 4 is substantially shorter than that of the first-mentioned peripheral surface 3.

Disposed between the opposite ends of support surface 3 are a plurality of equally angularly spaced stepped projections or film feed teeth generally identified by the numeral 9. Each projection or film feed tooth 9 comprises a base or lower portion 5 and a tip or upper portion 6 having a narrower width than said lower portion 5 (as seen in the axial direction of the body), with portions 5 and 6 being unitarily formed and integrally connected to each other at a point defined by axially spaced shoulders 7, the function of which will be described hereinbelow.

The opposite sides of each film feed tooth 9 are curved in the direction substantially perpendicular to the axis of the body as shown in FIGS. 1 and 3 and identified by the reference numeral 8 and converge toward the upper end of the associated film feed tooth 9. The curvature of the sides 8 of the film feed teeth 9 are so selected that the feed holes 11 in the new type 8 mm. film A may smoothly engage and clear the upper portions 6 when the new type film A is fed over the sprocket and the feed holes 11' in the old type 8 mm. film B may smoothly engage and clear the base portions 5 when the old type film B is fed over the sprocket. As mentioned above, the body 1 is further provided at the extreme right end, or adjacent to and outwardly of the peripheral support surface 4, with the flared flange 10 which has a radius $c$ from the center 0 of the body 1 substantially corresponding to the distance $b$ between the shoulder 7 of each film feed tooth 9 and the body center 0 (see FIG. 6).

The novel sprocket is adapted to selectively feed the two different types of movie films now available in the movie industry, that is, the new type 8 mm. movie film A and the old type 8 mm. movie film B. The new type 8 mm. film A has equally spaced feed holes 11 in a row adjacent to and inwardly spaced from one side edge of the associated film and each hole has the dimensions of 0.91 mm. (in the widthwise direction of the film) x 1.14 mm. (in the lengthwise direction of the film). The distance between the centers of the adjacent feed holes 11 (as seen in the lengthwise direction of the film) is 4.234 mm. On the other hand, the old type 8 mm. film has equally spaced feed holes 11' in a row adjacent to and inwardly spaced from one side edge of the associated film and each hole has the dimensions of 1.27 mm. (in the widthwise direction of the film) x 1.88 mm. (in the lengthwise direction of the film). The distance between the centers of the adjacent feed holes 11' (as seen in the lengthwise direction of the film) is 3.84.

To function effectively, the dimensions of the teeth 9 of the sprocket are selected such that the dimensions of the upper portions 6 suitably conform to those of the feed holes 11 of the new type 8 mm. film A, while the dimensions of the base portions 5 suitably conform to those of the feed holes 11' of the old type 8 mm. film. When the sprocket is operated so as to feed the new type 8 mm. movie film A, three successive feed holes 11 in the film A simultaneously engage the upper portions 6 of the corresponding film feed teeth 9 on the sprocket, as shown in FIGS. 1 and 2. At such time the new type 8 mm. movie film is supported across the two surfaces 7 and the opposite support surface 10.

On the other hand, when the sprocket is operated so as to feed the old type 8 mm. movie film B, three successive feed holes 11' in the film B simultaneously engage the base or lower portions 5 of the corresponding film feed teeth 9 and accordingly, the film B is fed while being supported by the axially spaced lower support surfaces 3 and the opposite support surface 4, as shown in FIGS. 3 and 4.

As seen in FIG. 5, when the new type 8 mm. movie film A is disposed on the sprocket it is shifted to a position to the right by a distance $d$ as compared to the position of old type film B. When the new type film A is to be fed over the sprocket the feed holes 11 of the film A engage the upper portions 6 of the film feed teeth 9 and the opposite edges of the film are supported by the axially spaced bordering shoulders 7 which form one support surface and the opposite flange 10 which forms a second support surface. On the other hand, when the old type film B is to be fed over the sprocket the feed holes 11' of the film B engage on the base portions 5 of the film feed teeth 9 and the film is supported on opposite axial sides of the portions 5 by the first peripheral surface 4, as shown in FIGS. 3 and 4.

The fact that the shoulders 7 and flange 10 cooperate in forming the support surfaces for the new type 8 mm. film A will be appreciated when reference is made to FIG. 5. As is seen in this FIG. 5, the outer edges of the feed holes 11 of the new type film A are nearer to the closest edge of the associated film by a distance $d$ than is the proximity of the outer edges of the feed holes 11' to the closest edge of the associated film B. Therefore, when the feed holes 11 of the new type film A engage the upper portions 6 of the film feed teeth 9, the opposite edge of the film is supported by the flange 10, as seen in FIG. 2. Thus, the shoulders 7 and flange 10 support the opposite respective edges of the new type film A.

With the above-mentioned construction and arrangement of the novel sprocket, the same can selectively feed the new and old type 8 mm. movie films now available in the movie industry with smoothness and without complicating the construction and operation of the projector in connection with which the sprocket is employed. Furthermore, the sprocket can be produced at a relatively low cost, and in addition, the novel sprocket may be readily employed in conjunction with any conventional projector.

Although only a preferred embodiment of the present has been described and illustrated herein, it is to be understood that the same is only illustrative in nature and is not intended to limit the scope of the teachings of the invention in its broader aspects. Many additional variations within the scope of the appended claims will occur to those skilled in the art.

I claim:
1. A film feed sprocket for a projector adapted to selectively feed two different types of movie films comprising:
   a hollow cylindrical rotary body having a curved peripheral recess between the opposite ends; laterally spaced first film support means provided adjacent to and outwardly of the opposite ends of said peripheral recess for supporting one type film of said two different types of films;
   a plurality of equally angularly spaced film feed teeth provided in the first film support means adjacent to and outwardly of one end of said recess between the opposite ends of the associated first film support means;
   said film feed teeth each having a stepped construction including a base portion of a wider width in the axial direction of said body and an upper portion of a narrower width in the axial direction of said body with the junction between said base and upper portions being connected by a shoulder;
   and a flared flange provided at the end of the body opposite to the end where said film feed teeth are provided whereby said shoulder and flange cooperate to form laterally spaced second film support means for supporting the other type of film.

2. A film feed sprocket for a projector adapted to feed two types of movie film having feed holes of different size, shape and spacing comprising:
   a cylindrical body member having a plurality of circumferential surfaces, recess intermediate the ends thereof;
   a first set of laterally spaced ones of said circumferential surfaces defining a first film support means for supporting one type of movie film;
   an annular flange formed adjacent one end of said cylindrical body member outwardly of one side of said first film support means, said annular flange including a circumferential support surface;
   a plurality of angularly spaced film feed teeth on the opposite end of said cylindrical body member in the circumferential surface forming the other side of said first film support means;
   each of said teeth including a base portion, an upper portion of reduced dimension in the axial direction of the cylindrical body member, and a shoulder formed at the junction of said base and upper portions whereby said shoulder and the circumferential support surface of the annular flange provide a second spaced film support means for supporting the other type of movie film.

3. A film feed sprocket as in claim 2, a circumferential recess arcuate in cross-section and extending between said sides of said first and second film support means.

4. A film feed sprocket as in claim 2, each of said shoulders being of arcuate contour having a radial center coinciding with the longitudinal axis of the cylindrical body member.

5. A film feed sprocket as in claim 4, wherein the radial center of the circumferential support surface of the annular flange is also coincident with the longitudinal axis of the cylindrical body member.

6. A film feed sprocket for a projector adapted to accommodate two types of movie film having feed holes of different size, shape and spacing comprising:
   a cylindrical body member including spaced circumferential surfaces and having an arcuate circumferential recess intermediate said spaced surfaces;
   first laterally spaced film support means formed by the spaced circumferential surfaces of said cylindrical body member for supporting the opposite edges of one type of movie film;
   second laterally spaced film support means formed by the spaced circumferential surfaces of said cylindrical body member and adapted to support the opposite edges of the second type of movie film at a radial distance displaced from said first laterally spaced film support means;
   and one circumferentially spaced array of film feed teeth defining one of said circumferential surfaces and including means to support at different radial distances the two types of movie film.

7. A film feed sprocket as in claim 6, each of said film teeth comprising a base portion, an upper portion of reduced dimension in the axial direction of the cylindrical body member, and a shoulder formed on each of said film teeth at the junction of said base and upper portions, and an annular flange formed on the opposite end of the cylindrical body member and provided with a circumferential support surface, whereby said circumferential support surfaces and said shoulders on said film teeth provide the second laterally spaced film support means.

References Cited
UNITED STATES PATENTS 1,955,938   4/1934   Berkowitz _____ 352—80

ALLEN N. KNOWLES, Primary Examiner

U.S. Cl. X.R.

226—87